United States Patent

Harris

[15] 3,673,138
[45] June 27, 1972

[54] MECHANICAL OXIDATION OF UNSATURATED POLYESTERS

[72] Inventor: Thomas G. Harris, 110 Jackson Drive, Lancaster, Pa. 17603

[22] Filed: Sept. 14, 1970

[21] Appl. No.: 72,152

[52] U.S. Cl. .................260/22 TN, 260/22 M, 260/40 R, 260/40 TN, 260/75 TN
[51] Int. Cl. .................C08f 27/10, C08f 27/22, C08g 17/14
[58] Field of Search..................260/75 T, 75 TN, 22 T, 22 M

[56] References Cited

UNITED STATES PATENTS

| 3,457,236 | 7/1969 | Ehrhart et al. | 260/75 |
| 2,877,203 | 3/1959 | Forsythe et al. | 260/75 |
| 2,974,112 | 3/1961 | Forsythe et al. | 260/22 |
| 1,581,902 | 4/1926 | Wright | 260/75 |
| 1,901,374 | 3/1933 | Luther et al. | 260/75 |
| 2,975,071 | 3/1961 | Ferrigno | 260/22 |

Primary Examiner—Donald E. Czaja
Assistant Examiner—Ronald W. Griffin
Attorney—William G. Taylor

[57] ABSTRACT

Liquid unsaturated polyester resins may be converted to millable compositions by blending the liquid polyester with a metallic drier and oxidizing the liquid mixture at elevated temperatures by mechanically mixing in the presence of an oxidizing atmosphere. A viscous gel forms on oxidation which, on cooling to room temperature, is suitable for compounding, milling and curing to form useful materials such as rubbery compositions, caulking compounds and resilient flooring.

1 Claim, No Drawings

MECHANICAL OXIDATION OF UNSATURATED POLYESTERS

BACKGROUND OF THE INVENTION

1. Field of the Invention

The invention relates to a process whereby liquid unsaturated polyesters are mechanically oxidized to form useful millable compositions.

2. Description of the Prior Art

Linoleum was first prepared by allowing an unsaturated vegetable oil, such as linseed or chinawood oil, to slowly drip onto cloth or scrim, a countercurrent of air gradually oxidizing this. The gel-like material thus formed was referred to as "cement" or "beef." This material was then suitably compounded and placed upon a substrate after which it was pressed and cured.

As demand for linoleum increased, mechanical equipment was devised to handle the oxidation step, and the process came to be known as "Mechanical Oxidation." This equipment conventionally consisted of a rotating drum holding the oil which was heated to an elevated temperature and through which a current of air was passed until the desired viscosity (determined by a penetration test) was reached. Other improvements in the processing of linoleum included the introduction of a metallic drier to accelerate oxidation and the incorporation of rosin as a viscosity depressant to allow extension of the oxidation. Replacement of the linseed and chinawood oils by more economical compositions occurred over the years, and one of the more successful commercial "cements" had the rosin chemically bonded to the oil.

SUMMARY OF THE INVENTION

In accordance with this invention, I have discovered that liquid unsaturated polyester resins may be mechanically oxidized to produce millable compositions which may be further compounded and milled and subsequently cured to form useful materials such as rubbery compositions useful for such industrial applications as gaskets and resilient flooring products. Since the ease with which the oils, from which linoleum was prepared, underwent oxidation was attributed largely to the presence of conjugated unsaturation in the oil, it is somewhat surprising to find that unsaturated polyesters as described herein and containing no conjugated unsaturation can be easily mechanically oxidized. Also somewhat surprising is the fact that the liquid unsaturated polyester resins of this invention will not oxidize readily in the presence of rosin. The mechanical oxidation provides an economical method of changing the unsaturated polyesters to a readily millable form.

DESCRIPTION OF THE PREFERRED EMBODIMENT

The liquid unsaturated polyester resins with which this invention is concerned comprise the reaction products of about 50 mol percent of an acid component; of which 30 to 50 mol percent is an aromatic dicarboxylic acid or its anhydride, including mixtures thereof, and of which 0 to 20 mol percent is an alpha-beta ethylenically unsaturated dicarboxylic acid or its anhydride, including mixtures thereof; and about 50 mol percent of diol component; of which 0 to 35 mol percent is an allyl unsaturated diol and of which 15 to 50 mol percent is either a polyoxy alkylene diol, an alkylene diol, or mixtures thereof. Of the initial reactants, at least 4 and no more than 35 mol percent of said reactants must be either an alpha-beta ethylenically unsaturated dicarboxylic acid, its anhydride or mixtures thereof or an allyl unsaturated diol or a mixture of such unsaturated acid and unsaturated diol.

The unsaturated polyester resins which are the subject of this invention are obtained by condensation of the acids or anhydrides with the diols to obtain a polyester, preferably having a minimum molecular weight of 2,500. When desired, the polyester resins may be chain extended by reaction with diisocyanates. Chain extension may be accomplished by reaction with almost any diisocyanate such as 2,4 toluene-diisocyanate, diphenylmethane diisocyanate and/or prepolymers obtained by reacting about 2 mols of such diisocyanate with one mol of a diol.

The polyester resins herein described are hydroxy terminated. The method of Ehrhart and Rohrer, U.S. Pat. No. 3,457,236, is helpful in preparing such polyester resins. In this method, a 10 to about 30 mol percent excess of the low boiling diol is used at the beginning of the reaction. The excess diol must be comparatively volatile in order to facilitate removal by distillation during the alcoholysis stage of the reaction.

The aromatic dicarboxylic acids, their anhydrides (or dialkylesters) may be represented by the following formulas:

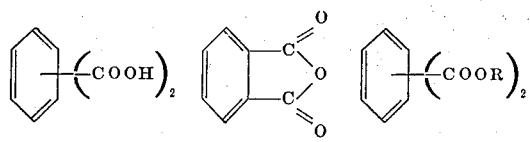

In the formula, R represents an alkyl radical of one to three carbon atoms. Examples of aromatic dicarboxylic acids, anhydrides and esters which are useful in forming the unsaturated polyester resins with which this invention is concerned are phthalic anhydride, o-phthalic acid, dimethyl terephthalate, isophthalic acid and terephthalic acid. Obviously, corresponding ring substituted aromatic dicarboxylic acids, anhydrides and esters might be substituted, in whole or in part. The aromatic dicarboxylic acid, anhydride and ester component may be comprised of a single acid, anhydride or ester or mixtures thereof.

Examples of alpha, beta ethylenically unsaturated dicarboxylic acids or anhydrides which are useful in forming the polyester resins with which this invention is concerned are maleic acid or its anhydride and fumaric acid.

The allyl unsaturated diol is a diol having allyloxy groups pendant to the diol chain and is generally of the formula:

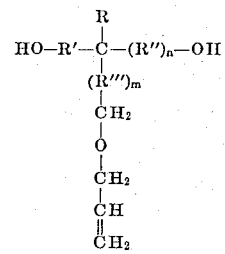

wherein the hydroxyl groups are primary or secondary and wherein R is H or an alkyl group of from one to five carbon atoms which may be straight or branched chain; R', R", and R''' are alkylene groups of from one to five carbon atoms which may be straight or branched chain; $m$ is equal to 0 or 1 and $n$ is equal to 0 or 1. Examples of such glycols are trimethylolpropane monoallylether, glyceryl monoallylether, pentaerythritol diallyl ether, and erythrityl diallyl ether.

A polyoxyalkylene diol of the formula:

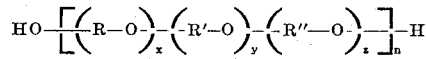

may be utilized. In this formula, R, R' and R" represent alkylene radicals of two to four carbon atoms which may be straight or branched chain and which may be the same or different. In the formula, $x$, $y$, and $z$ represent integers, one or two of which may be 0, the integers representing $x$, $y$, $z$, and $n$ are such that the molecular weight of the polyoxyethylene diol ranges from approximately 200 to 4,000. Mixtures of any of the above polyoxyalkylene diols may also be used.

More specifically, examples of the polyoxyalkylene diols having molecular weights of about 4,000 or less are polyoxyethylene diols, which are also known as polyoxyethylene glycols, of the formula:

Such polyether diols are commercially available under various trade names such as "Carbowax" (Union Carbide). In the formula, n may vary between 4 and 91 and preferably between 9 and 45. Examples of such compositions are Carbowax 400 wherein n is approximately 8 to 9, Carbowax 1,000 wherein h is approximately 21 to 23 and polyglycol E-2,000 (Dow Chemical) wherein n is approximately 44 to 46.

Another group of polyether diols may be represented by the formula:

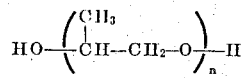

wherein n is approximately an integer of from about 3 to approximately 69. These polyether diols are referred to as polyoxypropylene diols or polyoxypropylene glycols and are available under the Union Carbide trade name Niax Diol PPG, two examples of which are Niax Diol PPG-425 wherein n is approximately 7 and Niax Diol PPG-1,025 wherein n is approximately 17 to 18.

Other useful polyether diols are the polyoxytetramethylene diols which compounds are commercially available under the Quaker Oats Company trade name Polymeg. Copolyether diols, available commercially under the trade name Pluronics (Wyandotte Chemicals) are also useful.

The alkylene glycols useful in preparing the polyester resins with which this invention is concerned are those of the formula:

wherein R is an alkylene radical of two to six carbon atoms which may be either straight chain or branched. Specific examples of these alkylene glycols are ethylene glycol, 1,2-propylene, 1,3-propane diol, 1,3-butane diol, 1,4-butane diol and neopentyl glycol.

In order to convert the liquid unsaturated polyester resin to a millable composition, the liquid polyester is conventionally treated in a rotating drum in which the liquid is held while it is heated to an elevated temperature and through which a current of air is passed. Metallic driers, up to 5 parts by weight, are preferably blended into the liquid polyester prior to or after introduction in the drum.

During oxidation, the liquid polyester resin is converted from a liquid form to a tough elastic polymer. The period of time necessary for the conversion is dependent upon the temperature to which the liquid is elevated, the amount and type of drier present and the temperature and amount of air or oxygen brought into direct contact with the liquid polyester. Of the driers utilized in the practice of the invention, manganese naphthenate and lead tallate are preferred.

In some of the following examples, it has been found that a slight degree of chain extension with a diisocyanate is desirable following the mechanical oxidation. The purpose of this reaction is to tie up loose saturated fragments that detract from the physical properties of the oxidized polyester.

The unsaturated polyesters of the examples which follow contain 0.03 percent by weight of tertiary butyl catechol which is utilized as an inhibitor, and the required oxidation time may be further regulated by varying the amount of this material.

The following examples illustrate specific embodiments of the invention:

EXAMPLE 1

An unsaturated polyester comprising the reaction product of the following:

| Reactant | Mol Percent |
| --- | --- |
| Phthalic anhydride | 40.42 |
| Maleic anhydride | 9.58 |
| Triethylene glycol | 28.26 |
| Ethylene glycol | 21.74 | and having an acid number of 0.8 and a hydroxyl number of 30.0 was initially blended with 0.03 percent by weight of 4 percent manganese naphthenate and mechanically oxidized by placing the liquid into a drum and rotating at 60 rpm while passing dry hot (100° F.) air through the rotating drum. The blend or mix was reacted for 75 minutes at a reaction temperature of about 200° F. The oxidized product was discharged from the drum and, on cooling, formed a viscous gel which was compounded as follows on a two roll mill (210° F./ 190° F.) and sheeted thereon (R.T./170° F.) to 0.120 inch gauge.

| Ingredient | Parts by Weight |
| --- | --- |
| Polyester gel | 100.00 |
| Limestone (50 mesh) | 20.35 |
| Limestone (325 mesh) | 60.61 |
| Calcium metal silicate | 40.69 |
| Titanium dioxide | 11.69 |
| Tertiary butyl peroxyisopropyl carbonate | 0.43 |

This sheet was cured by pressing at 350° F. and exerting 1,000 psi thereon to give a sheet 0.100 inch gauge having the properties set forth in Table I.

EXAMPLE 2

An unsaturated polyester comprising the reaction product of the following:

| Reactant | Mol Percent |
| --- | --- |
| Phthalic anhydride | 41.26 |
| Maleic anhydride | 8.74 |
| Triethylene glycol | 26.22 |
| Ethylene glycol | 23.78 | and having an acid number of 1.0 and a hydroxyl number of 30.8 was blended with 0.03 percent by weight of 4 percent manganese naphthenate. The blended liquid was added to a drum and oxidized by rotating the drum at 60 rpm while passing dry hot (100° F.) air through the rotating drum. A reaction time of 100 minutes and a reaction temperature of 200° F. resulted in the conversion of the liquid polyester blend to a tough viscous gel which was discharged from the drum and compounded on a set of rolls (220° F./200° F.) and sheeted (R.T./190° F.).

| Ingredients | Parts by Weight |
| --- | --- |
| Polyester gel | 100.00 |
| Wood flour | 72.73 |
| Limestone | 48.92 |
| Titanium dioxide | 38.09 |
| Tertiary butyl peroxyisopropyl carbonate | 0.43 |

The sheet thus formed was pressed at 350° F. and 1,000 psi to give a 0.090 inch resilient sheet usable as a floor covering and having the properties set forth in Table I.

TABLE I

| | Example 1 | 2 |
| --- | --- | --- |
| Thickness (mils) | 103 | 91 |
| Indentation (mils) (150 lb./0.178" tip/30 secs. at 73.4° F.) | 66 | 41 |
| Residual Indentation (8 oz. 10.125" tip/15 mins. at 73.4° F.) | 6 | 9 |
| Olsen Stiffness (inch—lb. at 20° C.) | 0.55 | 0.55 |
| Bend—Break Angle | >90° | >90° |
| Sandpaper Abrasion (gms. loss) dry | 2.73 | 1.67 |

| | | |
|---|---|---|
| wet (alkali) | 2.66 | 1.60 |
| Specific Gravity | 1.91 | 1.69 |
| Thermoplasticity | | |
| Indent 73.4° F. | 43 | 18 |
| Residual 73.4° F. | 3 | 3 |
| Indent 115° F. | 70 | 40 |
| Residual 115° F. | 3 | 9 |

EXAMPLE 3

An unsaturated liquid polyester comprising the reaction product of the following:

| Reactant | Mol Percent |
|---|---|
| Phthalic anhydride | 44.89 |
| Maleic anhydride | 5.11 |
| Polyoxyethylene glycol (M.W. 400) | 10.63 |
| Ethylene glycol | 39.37 | and having an acid number of 0.68 and a hydroxyl number of 15.52 was blended with 0.03 percent by weight of 4 percent manganese naphthenate (metallic drier) and mechanically oxidized by placing the liquid into a drum and rotating 60 rpm the liquid while passing dry hot (100° F.) air through the drum. A reaction time of eleven minutes at a temperature of about 210° F. formed a viscous gel which was discharged from the drum and compounded on a rubber mill as follows:

| Ingredients | Parts by Weight |
|---|---|
| Polyester gel | 100.00 |
| FEF Black | 30.00 |
| Stearic acid | 1.00 |
| Dicumyl peroxide (40% by weight in an inert carrier | 1.25 |

The compounded polyester gel, when sheeted and cured (10 seconds at 320° F.), formed a sheet having properties set forth in Table II.

EXAMPLE 4

96.34 parts by weight of an unsaturated polyester formed from,

| Reactant | Mol Percent |
|---|---|
| Phthalic anhydride | 45.84 |
| Maleic anhydride | 4.16 |
| Polyoxyethylene glycol (M.W. 400) | 21.07 |
| Ethylene glycol | 28.93 | were reacted with 1.38 parts by weight of toluene diisocyanate. This was then blended with 2.28 parts of a 16 percent lead tallate drier and mechanically oxidized at 240° F. Running time was 4 minutes. The polyester cement possessed a very slight tack and displayed a transition temperature of −16° C. It was compounded as follows:

| Ingredients | Parts by Weight |
|---|---|
| Polyester cement | 100.00 |
| FEF Black | 30.00 |
| Stearic Acid | 1.00 |
| Tertiary butyl catechol | 0.30 |
| Dicumyl peroxide | 1.25 | sheeted, and cured (10 seconds at 320° F.). The cured material showed properties listed in Table II.

TABLE II

| | Example 3 | 4 |
|---|---|---|
| Tensile strength, psi | 797 | 968 |
| Elongation, % | 360 | 350 |
| Hardness, Shore A | 46 | 48 |
| Gel content (Chloroform) % | 64 | 72 |

EXAMPLE 5

97.72 parts by weight of an unsaturated polyester of composition,

| Reactant | Mol Percent |
|---|---|
| Phthalic anhydride | 44.07 |
| Maleic anhydride | 5.93 |
| Polyoxyethylene glycol (M.W. 400) | 14.12 |
| Ethylene glycol | 35.88 | acid number 1.05, and hydroxyl number 22.10, were blended with 2.28 parts by weight of a lead tallate drier (2.35 percent lead tallate). Heat was applied and the whole heated to 240° F. at which point a current of air was passed through until a Mooney Viscosity of 10 was obtained.

At this point, 2.35 parts by weight of toluene diisocyanate were introduced dropwise. When addition was complete, the temperature was raised to 275° F. and held at this temperature for one hour.

0.3 parts by weight of tertiary butyl catechol were then added, thoroughly distributed, the whole discharged, and cooled. This was then compounded:

| | phr |
|---|---|
| Polyester cement | 100.0 |
| SRF Black | 20.0 |
| MT Black | 40.0 |
| Stearic acid | 1.0 |
| Dicumyl peroxide (40%) | 4.0 | sheeted and cured (15 seconds at 315° F.).

The cured material possessed properties as follows:

| | |
|---|---|
| Tensile strength, psi | 1092 |
| Elongation, % | 160 |
| Hardness, Shore A | 59 |
| Compression set (70 hours at 212° F.) | 55 |
| Transition temperature, ° C. | −14 |
| Gel content (Chloroform), % | 77 |

EXAMPLE 6

100 parts of an unsaturated polyester of the following composition,

| Reactant | Mol Percent |
|---|---|
| Phthalic anhydride | 45.70 |
| Maleic anhydride | 4.30 |
| Polyoxyethylene glycol (M.W. 400) | 21.13 |
| Ethylene glycol | 28.87 | acid number 1.25, and hydroxyl number 22.55 were mechanically oxidized and then chain extended with 3.08 parts of toluene diisocyanate. Following compounding, sheeting and curing as in Example 5 an elastomer with the following properties was obtained:

| | |
|---|---|
| Tensile strength, psi | 821 |
| Elongation, % | 300 |
| Hardness, Shore A | 45 |
| Compression Set (70 hours at 212° F.) | 65 |
| Transition temperature, ° C. | −20 |
| Gel content (Chloroform, %) | 69 |

EXAMPLE 7

97.72 parts by weight of an unsaturated polyester of composition,

| Reactant | Mol Percent |
| --- | --- |
| Phthalic anhydride | 41.69 |
| Maleic anhydride | 8.31 |
| Polyoxytetraethylene glycol (M.W. 624) | 6.23 |
| Ethylene glycol | 43.77 | acid number 0.76, and hydroxyl number 21.80; were blended with a lead tallate drier and mechanically oxidized at 200° F. Running time was 69 minutes.

The polyester "cement" was compounded on a rubber mill,

| | phr |
| --- | --- |
| Polyester cement | 100.00 |
| FEF Black | 30.00 |
| Stearic Acid | 1.00 |
| Dicumyl peroxide (40%) | 1.25 | sheeted and cured (15 seconds at 320° F.).

The cured sheet, 79 mils thick, was rubbery in nature and possessed a tensile strength of 995 psi, an elongation of 70 percent, a Shore A hardness of 75, and a gel content (Chloroform) of 77 percent.

The following examples illustrate mechanical oxidation of additional compositions to form millable materials:

EXAMPLE 8

97.72 parts by weight of unsaturated polyester of composition,

| Reactant | Mol Percent |
| --- | --- |
| Phthalic anhydride | 50.00 |
| Trimethylolpropane mono allyl ether | 31.06 |
| Polyoxyethylene glycol (M.W. 400) | 10.56 |
| Ethylene glycol | 8.38 | acid number 0.58, and hydroxyl number 27.14, were blended with 2.28 parts by weight of a lead tallate drier, and mechanically oxidized at 240° F. Running time was 49 minutes.

EXAMPLE 9

An unsaturated polyester of the following composition,

| Reactant | Mol Percent |
| --- | --- |
| Phthalic anhydride | 50.00 |
| Glycerol mono allyl ether | 29.00 |
| Polyoxyethylene glycol (M.W. 400) | 10.50 |
| Ethylene glycol | 10.50 | displaying an acid number of 0.78 and an hydroxyl number of 30.61, was mechanically oxidized at 240° F. Running time was 74 minutes.

This example illustrates use of two types of unsaturation.

EXAMPLE 10

An unsaturated polyester of composition,

| Reactant | Mol Percent |
| --- | --- |
| Phthalic anhydride | 45.79 |
| Maleic anhydride | 4.21 |
| Trimethylolpropane mono allyl ether | 25.27 |
| Polyoxyethylene glycol (M.W. 400) | 10.68 |
| Ethylene glycol | 14.05 | acid number 1.14, and hydroxyl number 40.95 was stabilized by the addition of 0.3 percent tertiary butyl catechol. This was later mechanically oxidized at 240° F. Running time was 2,500 minutes.

I claim:

1. A method for converting a liquid unsaturated polyester resin to a millable gum wherein the polyester is the reaction product of:

a. 30 to 50 mol percent of an acid component which is a member selected from the group consisting of $$\text{C}_6\text{H}_4(\text{COOH})_2, \quad \text{phthalic anhydride}, \quad \text{C}_6\text{H}_4(\text{COOR})_2$$

and mixtures thereof wherein R represents an alkyl radical of from one to three carbon atoms; and b. 0 to 20 mol percent of an acid component which is a member selected from the group consisting of an alpha, beta ethylenically unsaturated dicarboxylic acid, an anhydride thereof and mixtures thereof; and c. 0 to 35 mol percent of a diol component which is a member selected from the group consisting of a diol having an allyloxy group pendant from the diol chain and mixtures thereof; and d. 15 to 50 mol percent of a diol component which is a member having an average molecular weight less than about 4,000 selected from the group consisting of a polyoxyalkylene diol, an alkylene diol of the formula HO—R—OH wherein R is an alkylene radical of two to six carbon atoms, and mixtures thereof:

at least 4 mol percent and not more than 35 mol percent of said reactants being members selected from (b), (c) or mixtures thereof; the mole ratio of acid component to diol component is 1 to 1;

comprising mechanically oxidizing the liquid resin in an oxidizing atmosphere and in the presence of, based on 100 parts by weight resin, up to 5 parts by weight metallic drier, at a reaction temperature in the range of 200° to 350° F. for a period of time sufficient to convert the liquid to a viscous gel, and chain-extending the oxidized polyester by reaction with a diisocyanate.

* * * * *

UNITED STATES PATENT OFFICE
Certifcate

Patent No. 3,673,138            Patented June 27, 1972

Thomas G. Harris

Application having been made by Thomas G. Harris, the inventor named in the patent above identified, and Armstrong Cork Company, Lancaster, Pa., a corporation of Pennsylvania, the assignee, for the issuance of a certificate under the provisions of Title 35, Section 256, of the United States Code, adding the name of Charles Melvin Lindeman as a joint inventor, and a showing and proof of facts satisfying the requirements of the said section having been submitted, it is this 19th day of February 1974, certified that the name of the said Charles Melvin Lindeman is hereby added to the said patent as a joint inventor with the said Thomas G. Harris.

FRED W. SHERLING
*Associate Solicitor.*